Figure 1:
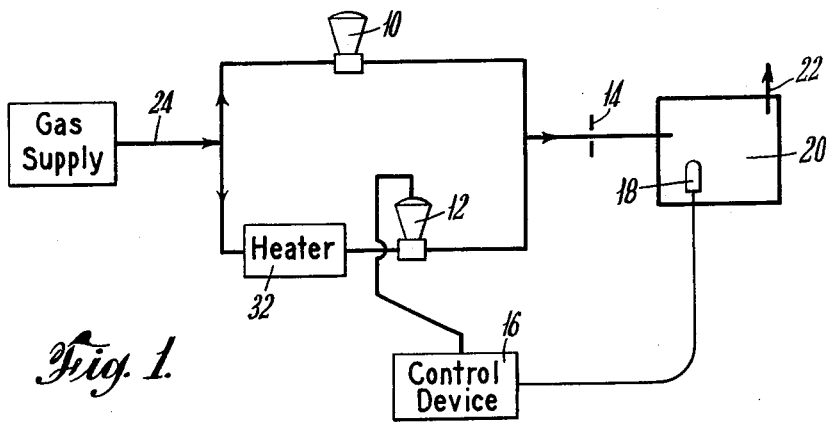

Aug. 28, 1962    S. T. MARTIN ET AL    3,051,392
PRECISION TEMPERATURE CONTROLLER
Filed Sept. 17, 1957    2 Sheets-Sheet 1

INVENTORS
STERLING T. MARTIN
STANFORD B. SPRACKLEN

BY
ATTORNEY

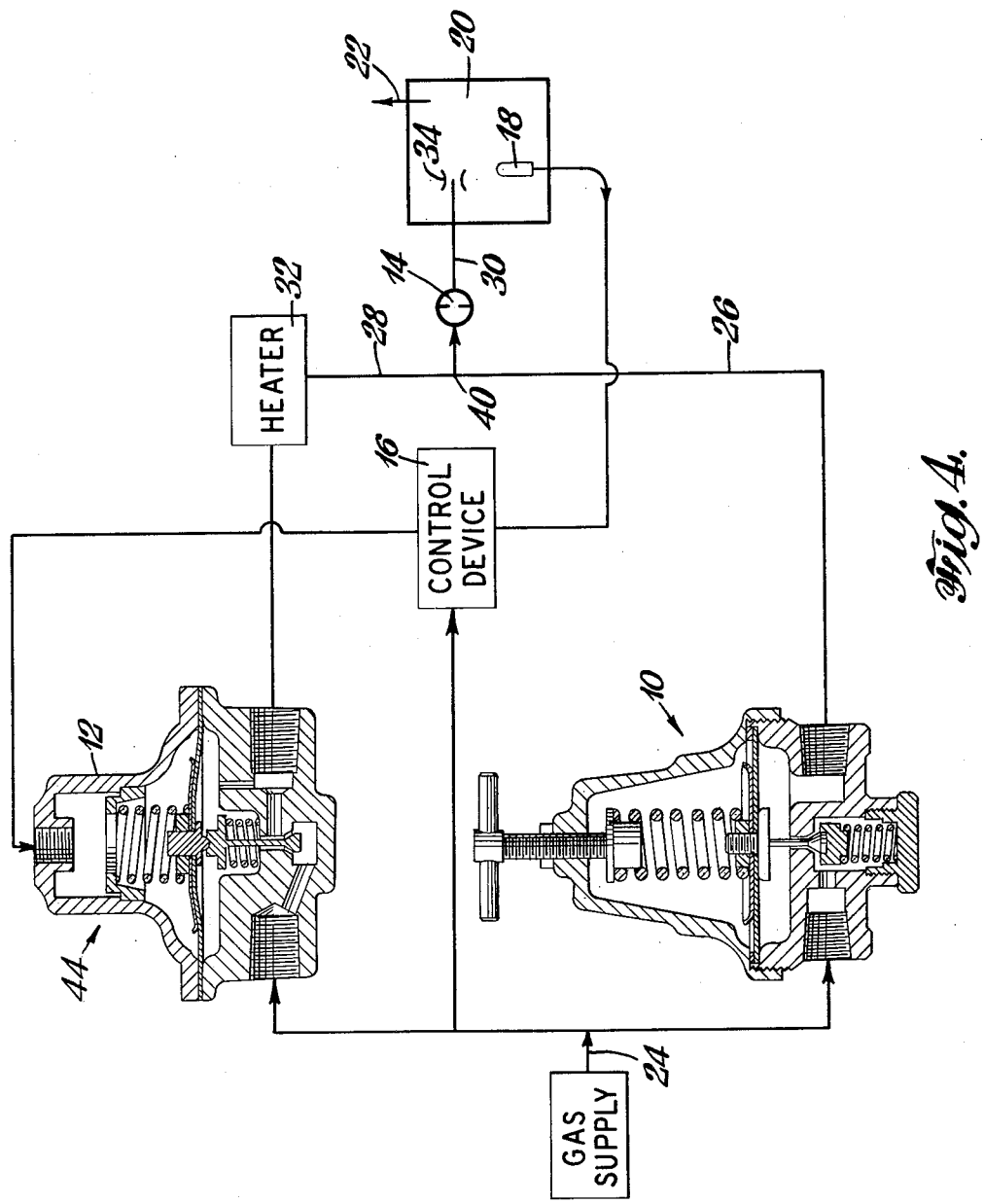

United States Patent Office 3,051,392
Patented Aug. 28, 1962

3,051,392
PRECISION TEMPERATURE CONTROLLER
Sterling T. Martin, Charleston, W. Va., and Stanford B. Spracklen, Fullerton, Calif., assignors to Union Carbide Corporation, a corporation of New York
Filed Sept. 17, 1957, Ser. No. 684,536
5 Claims. (Cl. 236—13)

This invention relates to a method and apparatus for providing precise temperature control of a constantly flowing gas stream. Atmospheres having a closely-controlled temperature are essential for many scientific applications. Most chemical reactions have an optimum temperature range and many can be effected only within narrow temperature limits.

In the field of instrumentation, temperature control of the equipment is very important since temperature variations cause errors in the responses of the detecting elements. It is, also, often desirable in certain instruments to achieve constant purging of the atmosphere within an instrument casing while maintaining a constant temperature.

Many temperature control systems are presently in use, a more common type being an electric heating element and a thermostatic control therefor to vary the current through the element. Such a heating element may be placed in an insulated cubicle with a circulating fan or placed in a continuous flow gas line. In the first instance, a continuous purging of the cubicle is not possible and in the second, a close temperature control cannot be attained without very complex control equipment.

Another system commonly used to attain a temperature-controlled, continuous gas flow comprises placing a constantly energized heater in the supply line and throttling the hot gas supply. However, the temperature fluctuations of such a system make it unsuitable for many applications.

Still another system of the prior art for attaining a temperature-controlled, continuous gas flow comprises mixing a hot and cold air source with a proportioning valve wherein a thermostatic element controls angular position of the valve and an increase in one stream is accompanied by a corresponding decrease in the other. However, experience has shown that comparatively large temperature variations result from such a proportioning system unless very complicated and sensitive control elements are used.

In summary, the devices of the prior art have proved either too inaccurate for precision work or too complicated and expensive for use on any but the most delicate laboratory equipment.

It is, accordingly, an object of the present invention to provide a simple, accurate method and apparatus for effecting temperature controlling of gas streams.

It is a further object to provide such a method and apparatus by proportionally mixing a heated and unheated gas stream over a portion of the operating range and throttling one of the streams over the remainder of the operating range.

It is a still further object to achieve the temperature control by varying the flow of the said heated and unheated gas streams through the use of a series of fixed and variable pressure regulating valves.

Other objects and advantages will be apparent from the description and appended claims.

Figure 2:
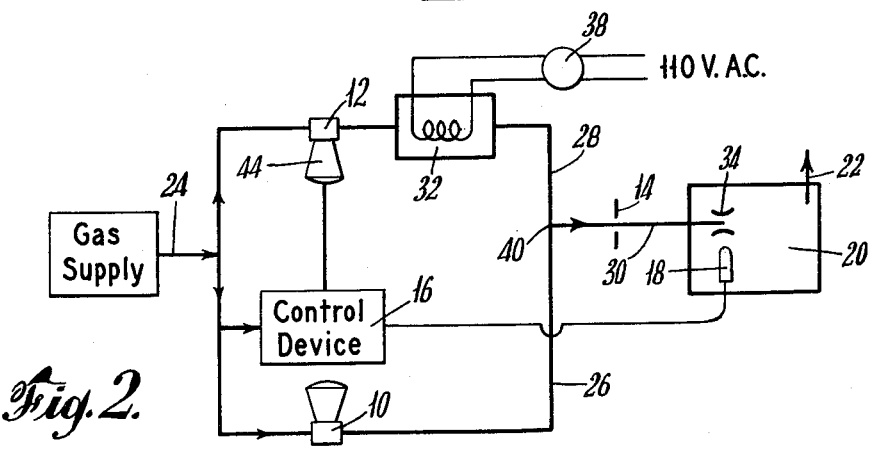
Figure 3:
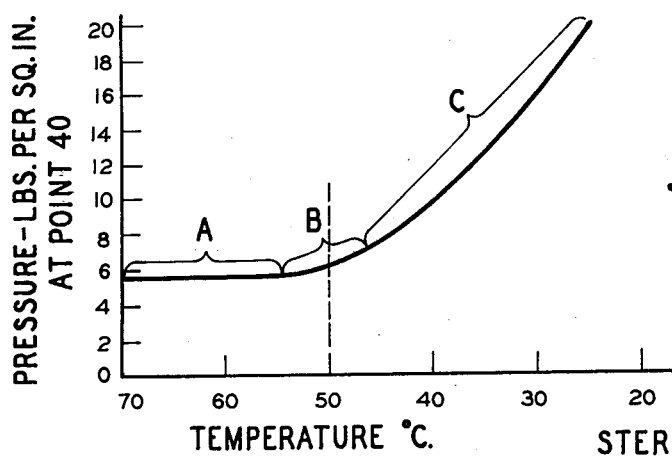

In the drawings:

FIG. 1 is a schematic representation of the apparatus aspect of the invention, showing the pneumatic circuit and controller therefor, FIG. 2 is a schematic diagram showing a specific embodiment of the apparatus of the invention, FIG. 3 is a graph of the total system flow showing the control characteristics of the system, FIGURE 4 is a schematic diagram showing the embodiment of apparatus according to FIGURE 2 and including illustration of internal components of the valves 10 and 12.

It is to be understood that the term "pneumatic," as used in the specification and claims, refers generically to all gaseous media and is not limited to air.

The instant invention represents an improvement over our application No. 684,594, now abandoned, which discloses a temperature control system utilizing proportional mixing of a hot and cold air stream over the entire range of operation. The system of said abandoned application utilizes a fixed restriction or orifice means in either gas stream and a common source of supply for the gas whereby parallel paths of flow through the fixed and variable restrictions are provided, the flow through the variable restriction being inversely proportional to the restricting effect.

According to the present invention, an apparatus for providing a temperature-controlled gas stream comprises a heated and an unheated gas stream, means for obtaining a fixed downstream pressure in one of said streams, said means having a gradual shut-off characteristic when the downstream pressure exceeds the fixed pressure setting, a variable pressure regulating means in the other of said streams, a single conduit means into which the heated and unheated streams flow, and a thermostatic element associated with said single conduit means and responsive to the temperature of the gas therein for controlling the variable pressure regulating means.

By means of the present invention, automatic controlled mixing of a heated and an unheated gas stream from common or separate unheated sources is accomplished. Referring more particularly to FIG. 1, an unheated gas supply feeds through a conduit 24. The gas stream then enters parallel conduits 26 and 28, one of which contains a heating element 32. A fixed pressure regulating valve 10 is located in one of the paths and a variable pressure regulating valve 12 is located in the other. The two paths 26 and 28 rejoin in a single conduit 30 at point 40 and pass through a fixed restriction means 14. The conduit 30 feeds into a receptacle means 20 which contains a thermostatic sensing element 18 and a venting means 22, if necessary. The thermostatic sensing element relays any changes in temperature to an appropriate control device 16, which mechanically varies the downstream pressure available through the pressure regulating valve 12. The route, by which pressure from the unheated gas supply is directed against the upstream side of the fixed restriction 14 discharging directly into the receptacle 20, is determined by means of automatic variation of the downstream pressure available through 12 which, as it is varied, changes the pressure at the downstream side of the fixed pressure regulator 10 with a resultant change in or stoppage of flow through it. A decrease in the flow of air through 12 is accompanied by increased flow through 10.

The sensing element 18 and controller 16 associated therewith may be any one of many temperature controllers available on the market. For example, the variable pressure regulating means 12 could be operated through pneumatic pressure or a linkage operated by an electric motor.

The embodiment of FIGS. 2 and 4 is an adaptation of the present invention whereby the temperature of an instrument cubicle is closely regulated and incorporates readily available commercial components. In this embodiment, the fixed pressure regulating means 10, a Watts regulator (Watts Regulator Co., Lawrence, Mass.), is a simple, small pressure reducing regulator. It may be adjusted to maintain various exit pressures depending upon the ambient conditions encountered.

The function of this device is normally to maintain a constant downstream pressure in the face of varying upstream pressures and flow. The valve comprises an operating valve stem which is positioned by an adjustable spring operating against a diaphragm which is acted on by the pressure within the system. In operation such a valve will shut off completely when the downstream pressure available from some other source exceeds the particular downstream pressure for which the valve is set. However, the valve does not act instantaneously when the downstream pressure from the other source, in this case from the variable pressure regulating means, approaches its pressure setting; it starts to close when the downstream pressure is within half a pound of the setting and is not completely closed until the pressure downstream is about half a pound above the pressure setting of the regulator.

The heating element 32 is controlled through a Variac 38 and may be set at different input values depending upon ambient conditions. The controller 16, utilized in this embodiment, is a Johnson temperature controller or thermostat (Johnson Service Co., Milwaukee, Wis.), Series T-800. This controller is essentially an automatic pneumatic valve, the exit pressure of which is varied in response to its temperature sensing element indicated at 18. The variable means 12 is a differential regulator (Conoflow Corporation, Philadelphia, Pa.), Model H-21. This regulator is a pneumatically operated valve in which the exit pressure or restriction is varied in accordance with pneumatic pressure upon its operating diaphragm 44. The fixed restriction 14 utilizes a thin plate orifice. In this embodiment, a conduit 30 empties into an instrument casing 20 through a venturi 34. A purging vent is provided at 22. All of the elements operate as in the description of FIG. 1, the same reference numerals being used to identify like elements. The temperature controller or thermostat, as it is known commercially, operates or varies the variable restriction means 12 pneumatically.

The Johnson temperature controller was selected although any one of a half dozen other similar controllers would work equally well. This instrument, as applied in the subject invention, produces an air output signal in the range 0 to 20 pounds per square inch in response to a change in temperature over the desired narrow temperature control range. The Conoflow differential regulator was chosen for approximately the same reasons. The regulator sets a downstream pressure of 3 pounds per square inch when the air pressure on the diaphragm is 0 pounds per square inch, the downstream pressure approximates 20 pounds per square inch when the diaphragm pressure is 17 pounds per square inch. In addition, for every one pound of pressure change on the diaphragm, the downstream pressure changes one pound accordingly.

In an operating example of the present invention, as shown in FIG. 2, the unheated gas supply feeding through conduit 24 was set to 20 pounds per square inch. The Watts regulator 10 which was set for 6 pounds per square inch, the controller 16 and the Conoflow differential regulator 12 are all directly connected to this line. As can be seen from the drawing, the heater 32 is connected in series with the variable pressure regulating means 12.

Assuming that the thermostat within the case is set to maintain a temperature of 50° C., hot air from line 28 and cold air from line 26 are mixing in the conduit means 30 and passing, via the venturi, into the case. Ignoring the small pressure drop, due to flow in line 28 and line 26, the pressure at point 40 is the downstream pressure of the fixed pressure regulator 10 and variable pressure regulator 12 and this pressure commands the ratio of hot air to cold air during the narrow range within which the diaphragm of the fixed pressure regulator begins to close the valve in response to increasing downstream pressure. The ratio of hot air to cold air obviously increases as the valve of regulator 10 slowly closes until the variable regulator is contributing all of the flow at point 40.

The maximum flow of cold air from fixed regulator 10 occurs when the pressure at point 40 is slightly less than 6 pounds per square inch. The maximum flow of hot air occurs when the pressure applied to this line by the variable pressure regulator 12 is 20 pounds per square inch. As stated above, it follows that when the variable regulator pressure at point 40 is slightly above 6 pounds per square inch, there can be no flow of cold air from the fixed regulator 10 into point 40. The thermostat controls the situation since, when the case is cold, it calls for hot air and vice versa. Within a narrow temperature band at a temperature control point, the two regulators proportion their contribution of air at point 40 so that the temperature of the air mixture passing out from the venturi 34 will satisfy the demands of the thermostat.

If the bulb senses a slight temperature decrease, the air pressure from the thermostat will increase and additional air will flow through line 42 into the control housing of the variable pressure regulator 12, and building up pressure on its diaphragm will cause the regulator to open wider and demand a greater downstream pressure through the heater. This increase of pressure in line 28 will increase the pressure at point 40 and the fixed regulator 10 will no longer be able to contribute as much pressure at point 40, therefore, flow of cold air from it will decrease.

For a temperature increase, the reverse action takes place. The pressure in line 42 decreases, the variable resistor closes proportionately, the pressure in line 28 decreases due to the reduced flow of hot air into point 42 and the diaphragm of fixed regulator 10 opens the valve further and, therefore, delivers more cold air into proportionating point 40.

The Variac is set to supply the voltage required to heat the air sufficiently to make the control possible. Actually, the average setting approximates 90 volts and may need to be adjusted seasonally to accommodate extremes of ambient temperatures.

The present improvement over the device disclosed in our abandoned application combines the effect of heated and unheated gas streams automatically proportioning their flow by means of the pressure regulating valves within a narrow range near the desired control temperature much as is done in said abandoned application and also is able to utilize the rapid heating effects possible with a throttled hot air source in case there is an extreme of cold experienced in the system.

Referring to FIG. 3, the effect of the novel pneumatic circuit of this invention may be more clearly seen. The graph shows the pressure at point 40 in pounds per square inch on the ordinate axis and temperature on the abscissa. Assuming a desired control temperature of 50° C., as shown by the dotted line, and a preselected pressure of 6 pounds downstream from the fixed pressure regulator 10, zone A indicates that when the temperature read by the thermostat is above the control temperature, the variable pressure regulator remains closed and the flow and pressure at point 40 are contributed entirely by the fixed regulator 10. Zone B indicates the narrow temperature band at which both the cold and hot air will be proportionally mixed, it being understood that normally the instrument will operate in this narrow range. Zone C indicates the temperature range in which the variable regulator overcomes the pressure of the fixed regulator and contributes all of the air to the system to rapidly restore the temperature to the control point. The greater pressure available in the event of wide temperature variations is also apparent, 20 pounds being available when the temperature momentarily drops to 35° C.

The instant invention also has the advantage of being able to be reset for any range of ambients by changing the setting of the fixed pressure regulator thereby keeping the control point within proportioning Zone B. Of course, the temperature of the unheated gas stream also determines this rough setting.

This system will temperature control a gas stream within ±1/10° C. within an insulated cubicle equally as well as the device of the abandoned application, and will also compensate for larger temperature variations much more rapidly.

It is to be clearly understood that the above-described operating example is intended to be illustrative only. The particular commercial components used as the pressure regulators and thermostat were readily available to the inventors and are not intended to any way limit the invention. The various operating pressures and Variac setting were found to be the best for maintaining a 50° C. cubicle temperature with the particular ambient temperature present and are not intended to limit the operating range of the device.

In the specific operating model, the heater is shown in the line with the variable pressure regulator. However, this was due to the fact that the particular variable regulator used had a larger capacity than the fixed regulator and thus a more rapid response to a heat demand was possible. The device will work with the heater in either line.

As is evident from the above description and the specific operating example, the present invention provides a novel pneumatic proportioning circuit for controlling the temperature of a continuous gas flow. It is relatively simple mechanically, can be constructed of inexpensive commercially available components, and maintains an extremely close temperature control over the gas stream. Although the operating example has been shown with the thermostatic element in an instrument cubicle to obtain temperature control therein, it may be easily seen that the system is readily adaptable for control of the temperature in any sort of receptacle or of the gas stream itself by placing the thermostatic sensing element in gas stream downstream from the fixed restriction in the mixing conduit.

Having thus fully disclosed and described the subject invention, what we desire to secure by Letters Patent is:

What is claimed is:

1. Apparatus for providing a continuous flow of temperature-controlled gas, comprising, in combination, a heated gas stream; an unheated gas stream; a selectably adjustable self-regulating valve in one of said streams, said valve having a gradual shut-off response characteristic for downstream pressures within a range which includes a preselected downstream pressure for which said self-regulating valve is selectably adjusted, a full shut-off response characteristic for downstream pressures greater than pressures within said range and a full open response characteristic for downstream pressures less than pressures within said range; a pneumatically operated controllably variable regulating valve disposed in the other of said streams, said pneumatically operated controllably variable regulating valve having located therein a controlling diaphragm arranged to be subjected on one side to pressure of said gas stream downstream of said variable regulating valve tending to close the valve and on a second side to pressure of a controlling pneumatic operating signal tending to open the valve, whereby said pneumatically operated controllably variable regulating valve is controlled according to a pressure differential obtaining between said gas stream and said pneumatic operating signal; a single conduit means into which said heated stream and said unheated stream flow; control means adapted to furnish a pneumatic operating signal to said pneumatically operated controllably variable regulating valve, said signal having an amplitude corresponding to temperature of a gas in said single conduit means; and temperature sensing means operably connected to said control means and arranged with respect to said single conduit means to respond according to temperature of a gas therein.

2. Apparatus according to claim 1 in combination with a fixed restriction in said single conduit means.

3. Apparatus for controlling temperature within a vented cubicle, which apparatus comprises, in combination, a heated gas stream; an unheated gas stream; a selectably adjustable pressure regulating valve in one of said streams, said valve having a gradual shut-off response characteristic for downstream pressures within a range which includes a preselected downstream pressure for which said valve is selectably adjusted, a full shut-off response characteristic for downstream pressures greater than pressures within said range and a full open response characteristic for pressures less than the pressures within said range; a pneumatically operated controllably variable pressure regulating valve disposed in the other of said streams, said pneumatically operated controllably variable regulating valve having located therein a controlling diaphragm arranged to be subjected on one side to pressure of said gas stream downstream of said variable regulating valve tending to close the valve and on a second side to pressure of a controlling pneumatic operating signal tending to open the valve, whereby said pneumatically operated controllably variable regulating valve is controlled according to a pressure differential obtaining between said gas stream and said pneumatic operating signal; a single conduit means into which said heated stream and said unheated stream flow, connecting said streams to the vented cubicle; control means adapted to furnish a pneumatic operating signal to said pneumatically operated controllably variable pressure regulating valve, said signal having an amplitude corresponding to temperature within said vented cubicle; and temperature sensing means operably connected to said control means and arranged in said vented cubicle to respond according to temperature of a gas therein issuing from said single conduit means.

4. Apparatus according to claim 3 in combination with a fixed restriction in said single conduit means.

5. Apparatus for providing a continuous flow of temperature-controlled gas to an enclosure, which apparatus comprises, in combination, a pressurized gas supply source, a selectably adjustable self-regulating valve having a gradual shut-off response characteristic for downstream pressures within a range which includes a preselected downstream pressure for which said self-regulating valve is selectably adjusted, a full shut-off response characteristic for downstream pressures greater than pressures within said range and a full open response characteristic for downstream pressures less than pressures within said range; first conduit means connecting said selectably adjustable self-regulating valve with said gas supply source; a pneumatically operable controllably variable regulating valve having located therein a controlling diaphragm arranged to be subjected on one side to pressure of a flow-controlled gas downstream of said variable regulating valve tending to close the valve and on a second side to pressure of a controlling pneumatic operating signal tending to open the valve, whereby said pneumatically operable controllably variable regulating valve is controlled according to a pressure differential obtaining between said gas stream and said pneumatic operating signal; second conduit means connecting said pneumatically operable controllably variable regulating valve with said gas supply source; control means adapted to furnish a pneumatic operating signal to said pneumatically operable controllably variable regulating valve, said signal having an amplitude corresponding to a temperature sensed in said enclosure; third conduit means connecting said control means with said gas supply source; fourth conduit means operably connecting said control means with said pneumatically operable controllably variable regulating valve; fifth conduit means connecting said selectably adjustable self-regulating valve with a flow junction point; sixth conduit means connecting said pneumatically operable controllably variable regulating valve with said flow junction point; seventh conduit means connecting said flow junction point with said enclosure; temperature sensing means operably connected to said control means and located in said enclosure to respond according to temperature of a gas issuing from said seventh conduit means; and heater means arranged to heat a gas stream passing through one of said valves.

References Cited in the file of this patent

UNITED STATES PATENTS

| | | |
|---|---|---|
| 1,022,188 | Geissinger | Apr. 2, 1912 |
| 1,296,968 | Klein | Mar. 11, 1919 |
| 1,942,269 | Davies et al. | Jan. 2, 1934 |
| 2,006,035 | Stewart | June 25, 1935 |
| 2,212,285 | Ayers | Aug. 20, 1940 |
| 2,265,599 | Griffey | Dec. 9, 1941 |
| 2,275,295 | Greenway | Mar. 3, 1942 |
| 2,366,236 | Clark | Jan. 2, 1945 |
| 2,508,074 | Miller et al. | May 16, 1950 |
| 2,519,475 | Kennedy | Aug. 22, 1950 |
| 2,793,812 | McDonald | May 28, 1957 |
| 2,828,076 | Donahue | Mar. 25, 1958 |
| 2,835,449 | Joesting | May 20, 1958 |

FOREIGN PATENTS

| | | |
|---|---|---|
| 253,317 | Great Britain | June 17, 1926 |
| 834,361 | France | Aug. 16, 1938 |